(12) United States Patent
Winkelbach

(10) Patent No.: US 10,252,653 B2
(45) Date of Patent: Apr. 9, 2019

(54) HEADREST SUPPORT

(71) Applicant: GRAMMER AG, Amberg (DE)

(72) Inventor: Carsten Winkelbach, Sinzig (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/624,724

(22) Filed: Feb. 18, 2015

(65) Prior Publication Data

US 2015/0239377 A1 Aug. 27, 2015

(30) Foreign Application Priority Data

Feb. 21, 2014 (DE) .................. 10 2014 002 233

(51) Int. Cl.
*B60N 2/68* (2006.01)
*B21D 39/04* (2006.01)
*B60N 2/809* (2018.01)
*B60N 2/80* (2018.01)
*B60N 2/897* (2018.01)

(52) U.S. Cl.
CPC .............. *B60N 2/68* (2013.01); *B21D 39/04* (2013.01); *B60N 2/80* (2018.02); *B60N 2/809* (2018.02); *B60N 2/897* (2018.02); *B60N 2002/899* (2018.02); *Y10T 29/49826* (2015.01)

(58) Field of Classification Search
CPC .................................................... B60N 2/4808
USPC ............................................................ 297/391
See application file for complete search history.

(56) References Cited

U.S. PATENT DOCUMENTS

| 3,881,668 | A | * | 5/1975 | Poteat | B65H 75/14 242/118.6 |
| 3,987,820 | A | * | 10/1976 | Alewitz | F16L 9/18 138/109 |
| 4,950,446 | A | * | 8/1990 | Kinumoto | B29C 49/26 138/97 |
| 5,478,136 | A | * | 12/1995 | Takeuchi | B29C 33/12 264/46.7 |
| 5,653,557 | A | * | 8/1997 | Gruber | E02D 5/76 405/259.1 |
| 5,788,250 | A | * | 8/1998 | Masters | B60N 2/4826 297/391 |
| 5,837,083 | A | * | 11/1998 | Booth | F16L 9/16 156/158 |
| 5,895,094 | A | * | 4/1999 | Mori | B60N 2/4814 297/391 |
| 6,296,316 | B1 | * | 10/2001 | Hann | B60N 2/4814 297/391 |

(Continued)

FOREIGN PATENT DOCUMENTS

DE 102008048969 A1 12/2009
DE 102010008925 A 8/2011

*Primary Examiner* — David E Allred
(74) *Attorney, Agent, or Firm* — Andrew Wilford

(57) ABSTRACT

The invention relates to a support (10) for a headrest, comprising a tube leg (11) to which a head support part can be attached and having at least one free end (12a, 12b) for anchoring the support (10) in a seat fitting of an automobile seat, at least one reinforcing sleeve (15) being in the tube leg (11) for reinforcing at least one area (25) of the tube leg (11). The characterizing feature is that an outer surface (16) of the reinforcing sleeve (15) is in contact with an inner surface (17) of the tube leg (11) in a first circumferential region (T1) and that, in a second circumferential region (T2), the outer surface (16) has a groove (23) into which a ridge (22) projecting inward past the inner surface (17) engages.

8 Claims, 3 Drawing Sheets

(56) References Cited

U.S. PATENT DOCUMENTS

| | | | |
|---|---|---|---|
| 6,631,956 B2* | 10/2003 | Mauro | B60N 2/48 297/391 |
| 8,047,606 B2* | 11/2011 | Matsui | B60N 2/4885 297/216.12 |
| 8,356,863 B2 | 1/2013 | Arcidiacone | |
| 9,399,422 B2* | 7/2016 | Hungerford | B60N 2/487 |
| 2002/0060489 A1* | 5/2002 | Richard | B21D 22/04 297/391 |
| 2002/0157235 A1 | 10/2002 | Napolitano, Jr. et al. | |
| 2003/0144071 A1* | 7/2003 | Dodge | A43B 13/026 473/316 |
| 2004/0021360 A1* | 2/2004 | Key | B60N 2/48 297/452.18 |
| 2005/0077772 A1* | 4/2005 | Yamada | B60N 2/4814 297/410 |
| 2006/0163928 A1* | 7/2006 | Droche | B60N 2/4817 297/406 |
| 2008/0083855 A1* | 4/2008 | Oda | B29C 45/14549 248/118 |
| 2009/0021069 A1 | 1/2009 | Hentschel et al. | |
| 2011/0031795 A1* | 2/2011 | Arcidiacone | B21D 17/02 297/391 |
| 2014/0145486 A1* | 5/2014 | Wisniewski | B60N 2/4808 297/391 |
| 2015/0239376 A1* | 8/2015 | Hunt | B60N 2/48 297/391 |
| 2015/0239377 A1* | 8/2015 | Winkelbach | B21D 39/04 297/391 |
| 2018/0335164 A1* | 11/2018 | Park | F16L 1/09 |

\* cited by examiner

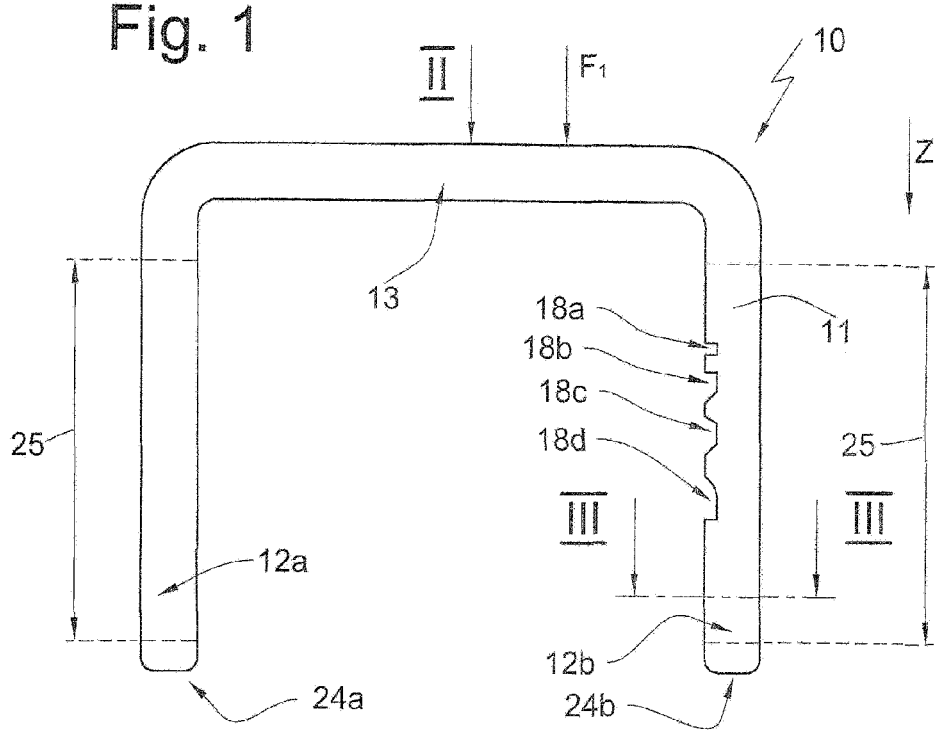
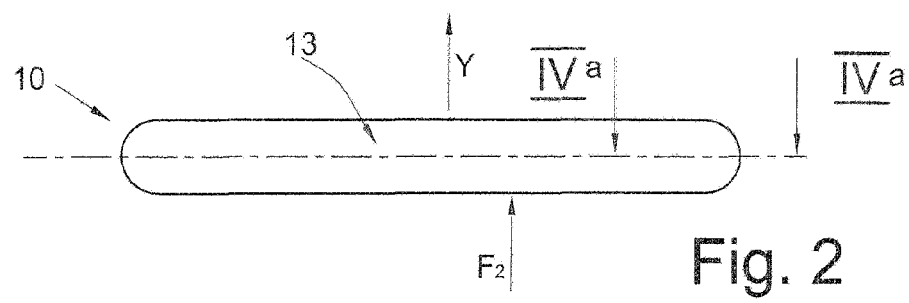
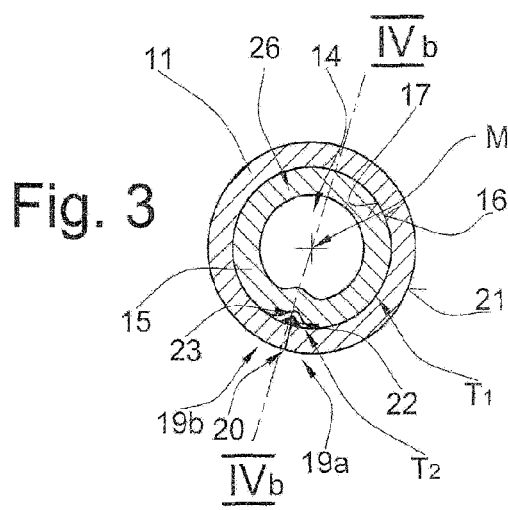

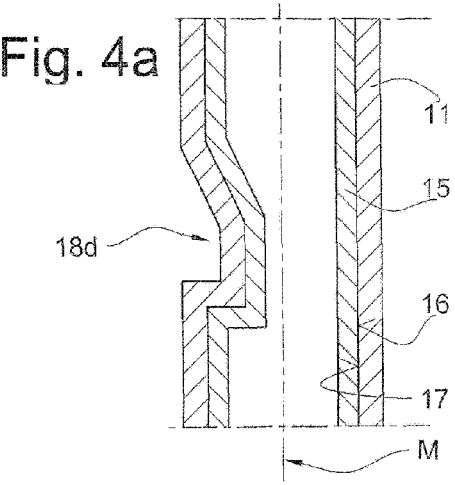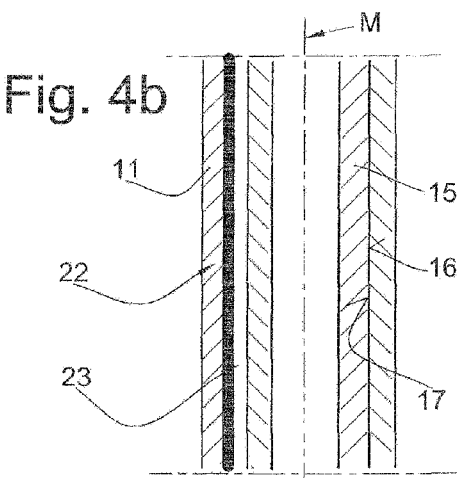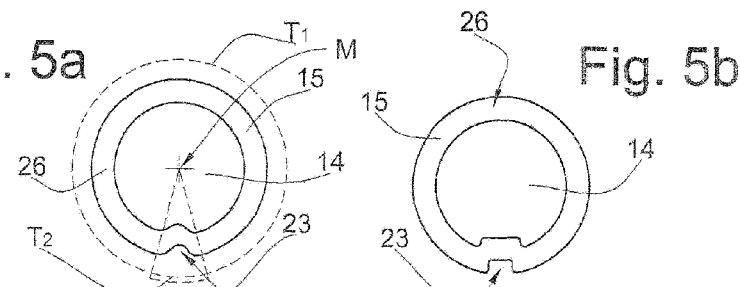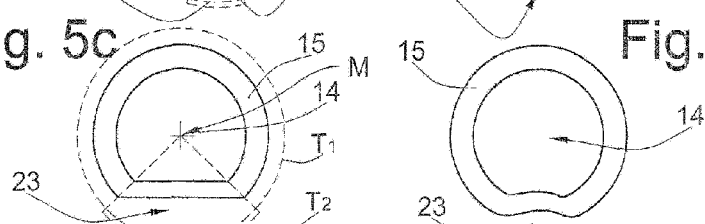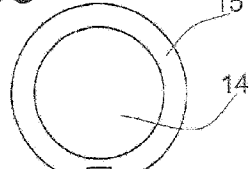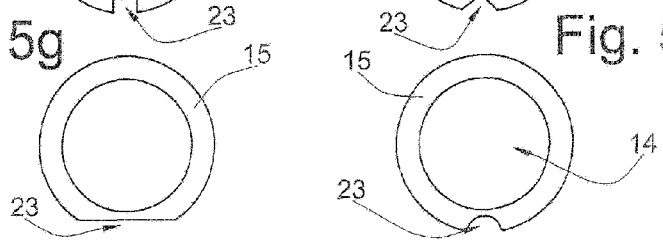

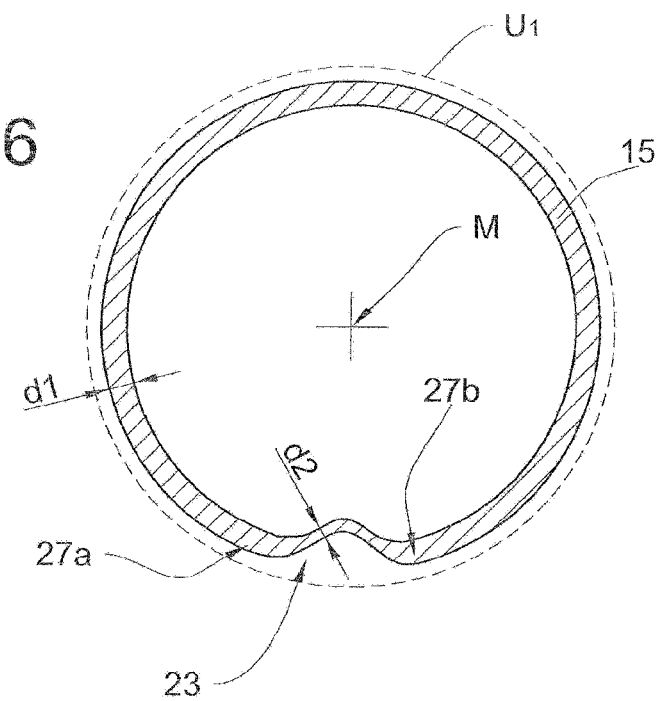
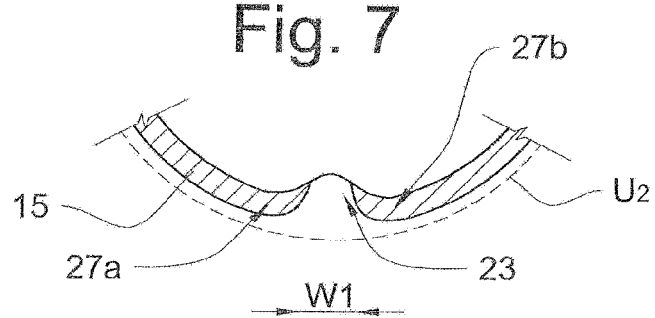
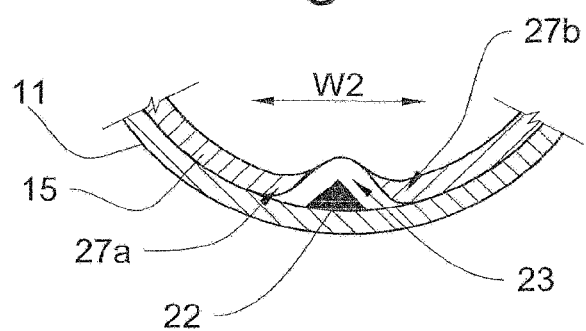

HEADREST SUPPORT

The invention relates to a support for a headrest. Support rods are produced as tubing in order to reduce their weight. The tube is made from a steel strip, for example, by wrapping the steel strip into a tube and joining the abutting edges of the strip to each other with a longitudinal weld. The weld is machined on the outer surface such that it does not project beyond the outer surface of the tube.

In places in which the tube leg has been weakened by detent notches, or in places subjected to a high load, it was known from the prior art to reinforce the tube leg with a reinforcing tube. The reinforcing tube is provided only in part of the tube leg, for example. Such a support is known, for example, from EP 2 281 644 [U.S. Pat. No. 8,356,863].

Inside the tube leg, the reworking of the weld is possible only with great difficulty, so the inwardly projecting part of the weld is usually not processed. This has the drawback, however, that a reinforcing tube cannot readily be fitted into the tube. After all, the reinforcing function is only effective if the tube leg can transfer forces to the reinforcing tube.

EP 2 281 644 [U.S. Pat. No. 8,356,863] discloses a tube leg provided internally with a reinforcing element. The problem of the weld projecting into the interior of the tube leg is solved in this publication by the provision of a reinforcing tube with a longitudinal slit. The slit is dimensioned such that the inwardly projecting part of the weld can project into the gap formed by the slit. However, this design has the drawback that the strength of the reinforcing tube is reduced by the slit, so that the reinforcing function can be fulfilled by the inner tube only to a lesser extent.

DE 10 2010 008 925 discloses a tube leg with a reinforcing tube in which the support rod stay has a weld that projects inward. To enable installation of the reinforcing tube, it has a hexagonal cross section and abuts only with its corners against the tube leg. This design has the disadvantage that forces cannot be transferred very well between the outer tube and the inner tube. DE 10 2010 008 925 therefore proposes that the intermediate space between the tube leg and the reinforcing tube be filled, thus enabling transmission of forces between the tubes.

OBJECT OF THE INVENTION

It is the object of the invention to provide a tube leg with a reinforcing tube in which substantially greater strength of the tube leg is achieved by reinforcement and in which forces can be transferred well from the tube leg to the reinforcing tube.

SUMMARY OF THE INVENTION

The support according to the invention is provided for a headrest for automobile seats in land vehicles and in air- and watercraft. A headrest can be attached to the support. The support comprises at least one tube leg for anchoring the support in a seat fitting of an automobile seat.

In terms of the invention, the support can be formed by a U-shaped support tube having two legs as well as a crosspiece. Alternatively, at least one single leg can also be provided that can be supported with one end in a seat fitting fixed to an automobile seat and another other end carrying a headrest.

The support can be made by assembling different tube legs by welding or pressing, for example. Alternatively or in addition, the support can be made by joining at least one tube leg and at least one solid rod, for example by welding, insertion, or pressing.

At least one reinforcing sleeve is mounted in the tube leg for reinforcing at least part of the tube leg. For example, a reinforcing sleeve is arranged in one area of the tube leg. According to an alternative embodiment, reinforcing sleeves can be arranged in several areas of the tube leg. A reinforcing sleeve can also be arranged in the tube leg over the entire length of the tube leg, for example. An outer surface of the reinforcing sleeve is in surface contact with an inner surface of the tube leg in a first circumferential region.

The outer surface of the reinforcing sleeve has a groove into which a ridge projecting inward from the inner surface of the support leg engages. This projecting ridge is particularly formed by a weld. In terms of the invention, "groove" means that the wall of the reinforcing sleeve is formed in a set-back manner in an area of its circumference with respect to the adjacent outer surface or relative to the outer surface of the reinforcing sleeve. That is possible, for example, by removal of material or reshaping of the wall.

The outer diameter of the reinforcing sleeve has a backlash or transition fit relative to the inner diameter of the tube, for example. For instance, the projecting ridge can form a transition fit with the groove or with the outer surface of the reinforcing sleeve. Alternatively, however, a backlash fit or a transition fit can also be formed between the projecting ridge and the groove. The latter can be the case particularly if the reinforcing sleeve is connected in a positive or form-fitted manner to the tube leg by a common reshaping of tube leg and reinforcing sleeve, such as a notch, for example. A rattle-free seating of the reinforcing sleeve in the tube leg can be established in this way.

The groove extends the entire length of the reinforcing sleeve, for example. According to an alternative embodiment, the groove can also be formed in at least one area of the longitudinal extension of the reinforcing sleeve, for example. This can be the case, for example, if a rattle-free seating of the reinforcing is sleeve is desired and that is not achieved by other deformations formed in the area of reinforcement, such as notches, for example. In this case, the tube is pressed in, because the projecting ridge of the tube leg is oversized relative to the wall of the reinforcing sleeve in the areas of the sleeve that are not provided with a groove. If the weld of the tube leg is also formed only in one area of the tube leg, the groove can be formed only in some areas. The reinforcing sleeve is closed over its entire circumference in a longitudinal area in which the groove is formed.

If the support is U-shaped, it can be manufactured by first bending the tube leg such that a U-shape with a crosspiece and legs is produced. Then a reinforcing sleeve is inserted into at least one leg, particularly into both legs. Optionally, at least one deformation of the support, such as a notch, for example, is made by at least one reshaping step. According to an alternative method, the at least one reinforcing sleeve can also be inserted into the unbent tube leg and the reshaping can optionally be performed; in this method, the bending into the U-shape is done afterward.

The advantage of the support according to the invention is, among other things, that great forces can be transferred from the tube leg to the reinforcing sleeve, since a large surface contact is formed between the outer surface of the reinforcing sleeve and the inner surface of the tube leg. Moreover, the reinforcing sleeve is not weakened by a slit. The manufacture of the reinforcing sleeve is associated with low additional costs.

One embodiment of the invention is characterized in that the groove is made by reshaping, particularly by crimping. In this embodiment, the groove can be produced cost-effectively, since the crimp can be formed in the reinforcing sleeve during the manufacturing process.

An alternative embodiment is characterized in that the groove is made by material-removing machining, such as turning, etching, stripping, or grinding, for example. This offers the advantage, for example, that the interior of the reinforcing sleeve is not bent inward during the manufacture of the groove.

Another embodiment is characterized in that the tube leg has such a small wall thickness in the area of the groove after reshaping or after the removal of material that the tube areas adjacent to the groove are able to deform elastically relative to each other. The areas adjacent to the groove can be moved elastically toward each other as the wall of the reinforcing sleeve bends elastically in. This can be supported, for example, by providing the tube leg with a slit in at least one area of its longitudinal extension.

In the method of the manufacture of a tube leg for a headrest, at least one reinforcing sleeve is provided whose outer diameter corresponds substantially to the inner diameter of the tube leg. The reinforcing sleeve is provided with a groove by reshaping or by machining and fitted through an open end of the tube leg into an interior of the tube leg such that a ridge projecting inward past the inner surface engages into the groove and abuts the outer surface of the reinforcing sleeve in the first circumferential region on the inner surface of the tube leg.

After fitting the reinforcing sleeve into the interior of the tube leg, detent notches can be formed in the support, for example. During such forming, both the tube leg and the reinforcing sleeve are reshaped, for example.

Before or after fitting the reinforcing sleeve into the interior of the tube leg, the tube leg can be bent into the desired shape, for example. For example, the tube leg can be provided with at least one offset or a curved bend. Alternatively or in addition, the tube leg can be bent into a U-shape with a crosspiece and two legs.

BRIEF DESCRIPTION OF THE DRAWING

Additional advantages of the invention follow from the description of the embodiments shown in the schematic figures.

FIG. 1 shows a U-shaped support rod tube for a headrest,

FIG. 2 shows a view of the U-shaped support rod according to arrow II of FIG. 1, FIG. 3 is a section taken along line III-III of FIG. 1, FIG. 4a is a section taken along line IVa-IVa of FIG. 2, FIG. 4b is a section taken along line IVb-IVb of FIG. 3, FIGS. 5a to 5h, with reference to FIG. 3, show different cross-sectional shapes of the reinforcement sleeve, FIG. 6, with reference to FIGS. 5a to 5h, is a cross section through another embodiment of the reinforcing sleeve, FIG. 7, with reference to FIG. 6, shows a section from the cross section of the reinforcing sleeve where areas of the sleeve wall adjacent the groove are moved elastically toward each other, FIG. 8, with reference to FIG. 7, shows the section with the reinforcing sleeve inserted into the tube leg.

SPECIFIC DESCRIPTION OF THE INVENTION

The overall support is designated in the drawings at 10. The same reference symbols in the various figures designate corresponding parts, regardless of whether lower-case letters are added or omitted.

The support 10 is U-shaped and has a legs 11 in the present illustrated embodiment. FIG. 1 shows a front view of the tube legs 11. A head support part (not shown) of a headrest can be attached to a crosspiece. According to an alternative embodiment, there can be a single straight support tube with the head support part held on one free end and the other free end provided in order to support the headrest in a seat of the backrest of an automobile seat.

The tube legs 11 have free ends 12a and 12b as well as the crosspiece 13. The free ends 12a and 12b can be in seat fittings fixed to a backrest. Detent notches 18a, 18b, 18c and 18d are part of a latch by means of which the support 10 can be detachably locked in different positions relative to an seat fitting fixed to an automobile seat.

During a vehicular collision, as a result of the impact of the head of the passenger, forces F1 and F2 act on the support 10 in the direction z and in the direction y. As a result, high loads occur in certain areas of the tube leg 11. The tube leg 11 is therefore provided with reinforcement in an area 25.

A section through the free end 12b is taken at III-III. The section is shown in FIG. 3. It can be seen that a reinforcement sleeve 15 is fitted coaxially into an interior 14 of the tube leg 11. The reinforcing sleeve 15 and the tube leg 11 have a longitudinal axis M. The reinforcing sleeve 15 has a length that corresponds to that of the reinforcement area 25 shown in FIG. 1. In a first circumferential region T1 of the reinforcing sleeve 15, an outer surface 16 of the reinforcing sleeve 15 rests against the inner surface 17 of the tube leg 11.

The tube leg 11 is made from a steel strip having edges 19a and 19b. The edges 19a and 19b are joined by a weld 20. The outer surface 21 of the tube leg 11 has been machined so that the weld 20 does not project beyond it. However, since the inner surface 17 can only be machined with difficulty, the weld 20 forms thereon a projecting ridge 22. In a second circumferential region T2, the outer surface 16 of the reinforcing sleeve 15 has a groove 23 into which the ridge 22 engages. The circumferential regions T1 and T2 are better recognizable, for example, on the reinforcing sleeve 15 shown in FIG. 5a, which corresponds to the reinforcing sleeve 15 according to FIG. 3. The circumferential region T1 is represented by a broken line and the circumferential region T2 by a broken double line.

The groove 23 can be formed over the entire longitudinal extension of the reinforcing sleeve 15, for example. Various embodiments of the reinforcing sleeve 15 are shown in FIGS. 5a to 5h, the groove 23 having been produced in the reinforcing sleeves 15 according to FIGS. 5a, 5b, 5c and 5d by reshaping, and according to FIGS. 5e, 5f, 5g and 5h by material-removing machining, such as turning, etching, stripping or grinding. All embodiments of the reinforcing sleeve 15 according to FIGS. 5a to 5h can form the reinforcing sleeve 15 shown in FIGS. 3 and 4.

FIG. 2 shows a top view of the tube legs 11 according to arrow II of FIG. 1. A longitudinal section corresponding to IV-IV is shown in FIG. FIGS. 4a and 4b. Only a region of the free end 12b is shown in the longitudinal section. Since the notches 18a to 18d were produced after the reinforcing sleeve 15 was mounted in the tube leg 11, the outer surface 16 rests against the inner surface 17 in a positive and form-fitting manner in the areas of the notches 18a to 18d as well.

The support 10 is manufactured as described below:

A groove 23 is formed in the reinforcing sleeve 15 by reshaping or material removal. The ends 12a and 12b of the tube leg 11 are bent relative to the crosspiece 13 so that a U-shape is formed. A reinforcing sleeve 15 is pushed into the interior space 14 of each free end 12a and 12b of the tube leg 11 via a respective open end 24a or 24b until the reinforcing sleeve 15 is at the reinforcement area 25. Beforehand, the reinforcing sleeve 15 is aligned such that the projecting ridge 22 fits positively in the groove 23. Then the notches 18a, 18b, 18c and 18d are made in the support 10 by a reshaping tool.

According to an alternative method, the ends 12a and 12b of the tube leg 11 can be bent into the U-shape after carrying out the method steps of forming the groove 23 in the reinforcing sleeve 15, insertion of the reinforcing sleeve 15 into the reinforcement area 25 of the tube leg 11 and making of the notches 18a to 18d in the tube leg 11.

In the above-mentioned method alternatives, the method step of the making of the notches 18a-d can be omitted.

Another embodiment is shown in FIGS. 6 to 8. According to FIG. 6, the reinforcing sleeve 15 has a groove 23, a wall 26 of the reinforcing sleeve 15 having a thickness d2 in the area of the groove 23. Elsewhere in the non-deformed area, the wall 26 of the reinforcing sleeve 15 has a thickness d1. The thickness d2 is smaller than the thickness d1.

Upon insertion of the reinforcing sleeve 15 into the tube leg 11, the wall 26 can be elastically deformed under pressure in such a way that areas 27a and 27b of the wall 26 adjacent to the groove move toward each other according to the arrows w1, the circumference U1 of the reinforcing sleeve 15 (see FIG. 6) being slightly reduced to the circumference U2 (see FIG. 7). The reinforcing sleeve 15 can then be inserted into the tube leg 11 and arranged in the reinforcement area 25, the projecting ridge 22 engaging in the groove 23. After that, the pressure is removed, and the areas 27a and 27b move away from each other according to the arrow pair w2. Due to the elastic restoring force, the reinforcing sleeve 15 comes to rest with its outer surface 16 against the inner surface 17 under bias in the first circumferential region T1.

The invention claimed is:

1. A support for a headrest, the support comprising:
   an outer tube extending along an axis, to which a head support part can be attached, having at least one free end anchoring the support in a seat fitting of an automobile seat, and having an inner surface formed with a radially inwardly projecting and axially extending ridge; and
   at least one reinforcing sleeve coaxially fittable into the outer tube for reinforcing at least one area of the outer tube, closed over its entire circumference, having an outer surface in surface contact with the inner surface of the outer tube in a first circumferential region and, in a second circumferential region, being formed on the outer surface with a radially outwardly open groove into which the ridge projects inward from the inner surface of the outer tube, the groove extending over the entire length of the reinforcing sleeve such that the sleeve can be inserted axially into the outer tube with the ridge fitting in the groove.

2. The support defined in claim 1, wherein the groove is made by the steps of reshaping or crimping.

3. The support defined in claim 1, wherein the groove is made by the steps of turning, etching, stripping or grinding.

4. The support defined in claim 1, wherein the thickness of a wall of the non-deformed reinforcing sleeve is greater relative to the thickness of the wall in the area of the groove and the reinforcing sleeve can be elastically deformed such that a circumference of the reinforcing sleeve changes as the groove folds in.

5. The support defined in claim 1, wherein the ridge extends a full length of the outer tube.

6. A method of making a headrest support having an axially extending outer tube that can be attached to a head support part, that has at least one free end for anchoring the support in a seat fitting of an automobile seat, and that has an inner surface formed at least at the free end with an axially extending and radially inwardly projecting ridge, the method comprising the steps of:
   providing at least one reinforcing sleeve that is closed over its entire circumference whose outer diameter is substantially equal to an inner diameter of the outer tube,
   providing the free end of the reinforcing sleeve with a radially outwardly open and axially extending groove extending over the entire length of the sleeve by the steps of reshaping or machining, and
   fitting the reinforcing sleeve axially through an open end of the outer tube into the outer tube with the ridge projecting radially inward past the inner surface into the groove, moving the reinforcing sleeve axially along the outer tube.

7. The method defined in claim 6, further comprising the step, after fitting the reinforcing sleeve into the interior of the outer tube, of:
   forming at least one reshaped detent notch in the support.

8. The method defined in claim 6, further comprising the step of:
   bending a tube forming the outer tube into any shape before or after the method step of fitting the reinforcing sleeve into the interior of the outer tube.

* * * * *